United States Patent

[11] 3,633,856

| [72] | Inventor | Donald R. Crews<br>Peoria, Ill. |
|---|---|---|
| [21] | Appl. No. | 836,512 |
| [22] | Filed | June 25, 1969 |
| [45] | Patented | Jan. 11, 1972 |
| [73] | Assignee | Caterpillar Tractor Co.<br>Peoria, Ill. |

[54] ENGINE SUPPORT BUSHING ASSEMBLY
5 Claims, 4 Drawing Figs.

[52] U.S. Cl................................................... 248/9,
180/64, 267/153
[51] Int. Cl....................................................... F16m 5/00
[50] Field of Search........................................... 248/7, 5, 9,
10, 26; 267/153; 180/64; 308/26; 287/85

[56] References Cited
UNITED STATES PATENTS
2,001,562  5/1935  Bagley............................ 248/7

| 3,135,224 | 6/1964 | McLean....................... | 248/9 X |
| 3,194,614 | 7/1965 | Thomas........................ | 308/26 |
| 2,978,794 | 4/1961 | Lamson et al. ............... | 308/26 UX |
| 3,108,830 | 10/1963 | Fierstine....................... | 287/87 |

FOREIGN PATENTS

| 983,635 | 6/1951 | France ........................ | 248/10 |

*Primary Examiner*—J. Franklin Foss
*Attorney*—Fryer, Tjensvold, Feix, Phillips & Lempio ABSTRACT: A bushing assembly is mounted between a cross strut forming an integral part of a vehicle's frame and a trunnion secured to an engine block to dampen vibratory motion occurring therebetween. The bushing assembly comprises inner and outer rings having a slightly compressed annular elastomeric member or bushing mounted therebetween. A thin coating of polytetrafluoroethylene is formed on the outer surface of the inner ring to reduce the coefficient of friction between the inner ring and the bushing.

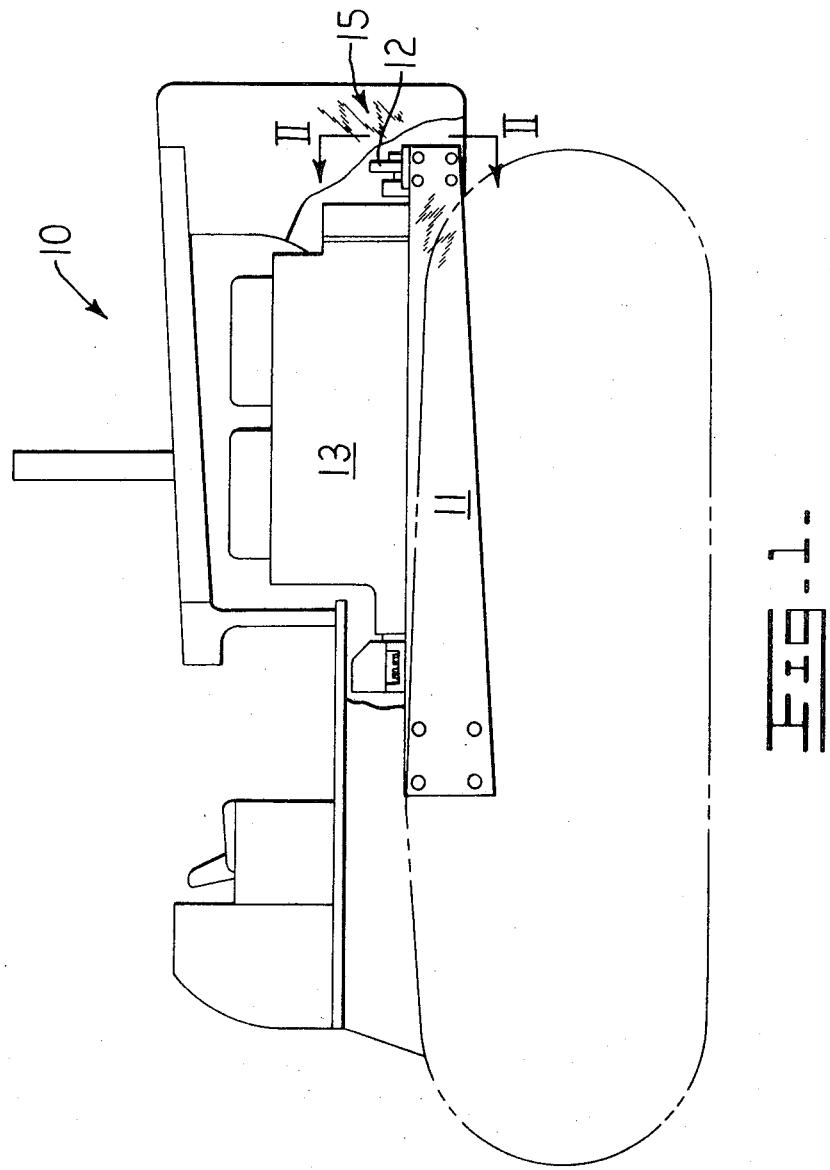

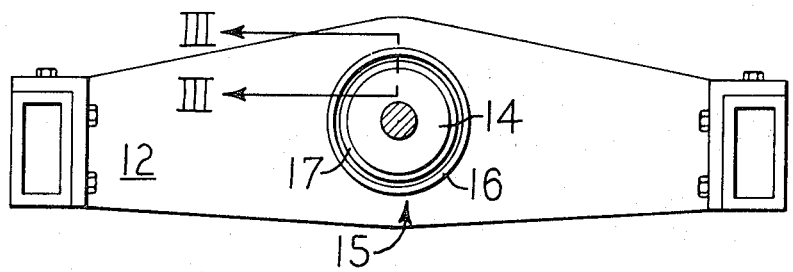
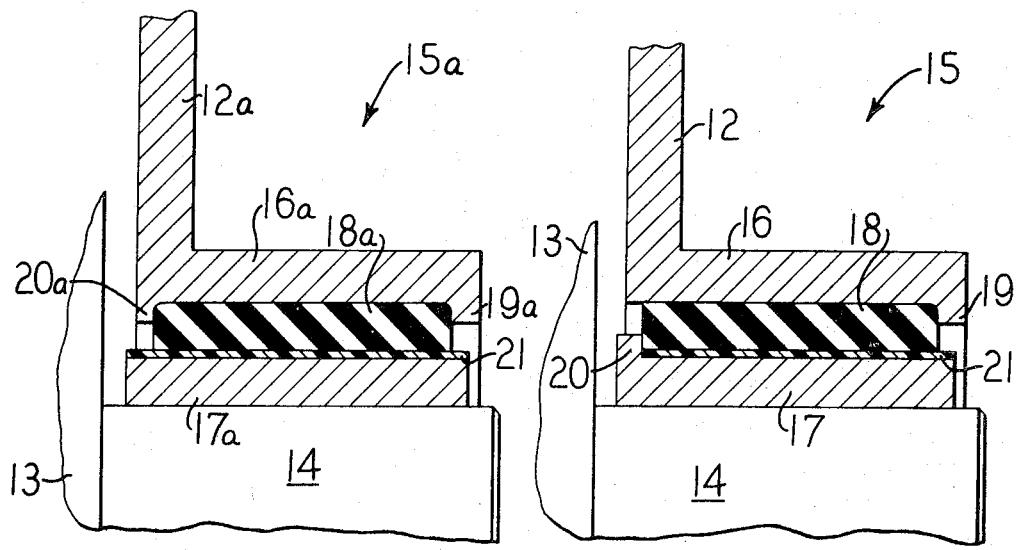

ENGINE SUPPORT BUSHING ASSEMBLY

A vehicle's engine is oftentimes supported by means of a three-point suspension system, including two rigid mounts located at the rear of the engine and a front mounting comprising a resilient bushing assembly. The front mounting normally comprises a cross strut secured to the vehicle's frame and a trunnion secured to the engine block. The bushing assembly is normally disposed between the strut and trunnion to dampen dynamic forces imposed on the engine during vehicle operation.

Conventional bushing assemblies normally comprise a highly compressed rubber bushing interposed between inner and outer retaining rings. If dynamic forces are not evenly distributed throughout the bushing assembly the bushing will tend to be forced out of the retaining rings in an axial direction, thus requiring substantial vehicle "shutdown" time for bushing replacement purposes. For example, conventional bushing assemblies require specialized equipment for the assembly and installation thereof, which is normally not readily available at a particular worksite.

An object of this invention is to overcome the above, briefly described problems by providing a noncomplex and economical bushing assembly for an engine support system adapted to function efficiently over a substantially long period of time. Such bushing assembly comprises an annular elastomeric member or bushing mounted between inner and outer retaining and positioning rings. The inner ring has a thin coating of low-friction material, such as polytetrafluoroethylene, formed thereon to prevent the bushing from binding thereon when dynamic forces are imposed upon the bushing assembly during vehicle operation.

Other objects of this invention will become apparent from the following description and accompanying drawings, wherein:

FIG. 1 is a partially sectioned, side elevational view of a track-type tractor employing a bushing assembly embodiment of this invention therein;

FIG. 2 is an enlarged sectional view taken in the direction of arrows 2—2 in FIG. 1, with parts removed for clarification purposes;

FIG. 3 is an enlarged sectional view taken in the direction of arrows 3—3 in FIG. 2; and FIG. 4 is a view similar to FIG. 3 but showing a modification of the FIG. 3 bushing assembly.

The track-type tractor 10 illustrated in FIG. 1 comprises a conventional frame 11 having a cross strut 12 (FIG. 2) formed integrally therewith. An engine 13 may be supported on such frame by two rear mountings (not shown) and a front mounting comprising a trunnion 14 secured to the engine block. This invention is essentially drawn to a bushing assembly 15 mounted between the strut and trunnion for dampening undue vibrations and related dynamic forces prevalent during vehicle operation.

The bushing assembly (FIG. 3) comprises outer and inner metallic retaining rings 16 and 17, respectively, having an annular elastomeric member or bushing 18 mounted therebetween. The outer ring may be formed as an integral part of strut 12, if so desired, and preferably comprises a circular flange 19 extending radially inwardly to abut a first, outboard end of the bushing. The inner ring comprises a circular flange 20 extending radially outwardly thereon to abut a second, inboard end of the bushing 18.

A thin coating 21 of low-friction material, such as polytetrafluoroethylene (Teflon), is suitably formed on the cylindrical outer surface of the inner ring which is juxtaposed to the inner cylindrical surface of the bushing. The coating may be sprayed, baked or otherwise suitably formed on the inner ring to a thickness approximating one-thousandth of an inch, for example.

The bushing is preferably slightly compressed between the inner and outer rings to afford the desired supporting desiderata thereat. For example, the bushing may comprise a resilient rubber composition having a durometer hardness approximating 80 and compressed between the rings to approximately 85 percent of its original, relaxed size. It should be understood that other types of suitable materials, such as various plastics exhibiting appropriate elasticity and related characteristics, could be utilized for the bushing.

Testing has shown that low-friction coating 21 will allow the inner surface portions of the bushing to slip within desired limits on the inner ring to prevent binding therebetween as loads are imposed on the bushing assembly. It has been further found that the bushing is subjected to substantially less destructive and nonuniform forces than are normally encountered with conventional bushing assemblies. In addition to enchanced stability, the bushing assembly of this invention also facilitates the use of a rubber or like bushing composition which is harder to adapt it for longer wear-life than those normally employed.

Flange or retaining means 19 and 20 will function to positively confine the bushing between the ring members to prevent extrusion thereof in both axial directions. It should be further noted, since the coating is formed on the inner ring member rather than on the inner surface portions of the bushing, that the bushing is not restrained in its movements by such material. Furthermore, it is apparent that the bushing assembly can be expeditiously assembled or disassembled by the use of conventional hand presses, for example.

FIG. 4 discloses a modified form of the bushing assembly, essentially differing therefrom in the type of retaining means employed for restraining axial movements of bushing 18. In particular, a cross strut 12a comprises an outer ring 16a having annular flanges 19a and 20a formed at the outboard and inboard ends thereof, respectively. An inner ring 17a has no flanges formed thereon to thus comprise a cylindrical configuration. The flanges will function to retain bushing 18 therebetween in a manner substantially similar to the restraining function afforded by flanges 19 and 20 of the FIG. 3 embodiment.

Various changes may be made to the above-described bushing assembly embodiments without departing from the scope of this invention. For example, a low-friction coating could be formed on the inner bore surface portions of outer ring 16 in addition to or in lieu of coating 21. Also, the disposition of the flanges illustrated in FIGS. 3 and 4 could be reversed, i.e., in FIG. 3 flanges 19 and 20 could be formed on the inner and outer rings, respectively, whereas in FIG. 4 flanges 19a and 20a could be formed on the inner ring rather than on the outer ring.

I claim:

1. An engine support system for a vehicle comprising a frame, a trunnion secured to an engine block and a bushing assembly mounting said trunnion of said frame, said bushing assembly comprising inner and outer metallic rings having a single annular, elastomeric member mounted therebetween with a durometer hardness approximating 8 and being compressed to approximately 85 percent of its original, relaxed size, a thin solid and homogeneous coating of polytetrafluoroethylene bounded to outer metallic surface portions of one of said rings, juxtaposed to surface portions of said member, for substantially preventing binding between said inner ring and said member during vehicle operation, said coating having a substantially uniform thickness throughout, approximating one-thousandth of an inch, retaining means for preventing said member from moving axially relative to said rings, and wherein said retaining means comprises spaced flange means secured to at least one of said rings to abut opposite ends of said member, said flange means comprising spaced first and second flanges secured to opposite ends of said ring to extend radially toward said other ring.

2. An engine support system for a vehicle comprising a frame, a trunnion secured to an engine block and a bushing assembly mounting said trunnion of said frame, said bushing assembly comprising inner and outer metallic rings having a single annular, elastomeric member mounted therebetween with a durometer hardness approximating 80 and being compressed to approximately 85 percent of its original, relaxed size, a thin solid and homogeneous coating of polytetrafluoroethylene bonded to outer metallic surface portions of one of said rings, juxtaposed to surface portions of said member, for substantially preventing binding between said inner ring and said member during vehicle operation, said coating having a substantially uniform thickness throughout, approximating one-thousandth of an inch, retaining means for preventing said member from moving axially relative to said rings, and wherein said retaining means comprises spaced flange means secured to said rings to abut opposite ends of said member, and including a first flange secured at an end of said outer ring to extend radially inwardly toward said inner ring and a second flange secured at an opposite end of said inner ring to extend radially outwardly toward said outer ring.

3. The invention of claim 2 wherein said first flange is formed as an integral part of said outer ring and is disposed on an outboard end thereof and said second flange is formed as an integral part of said inner ring and is disposed on an inboard end thereof adjacent to said engine block.

4. In an engine support system for a vehicle comprising a frame, a cylindrical trunnion member, and an annular bushing assembly disposed therearound and comprising an outer metallic ring member having a single annular elastomeric element mounted therebetween with a durometer hardness approximating 80 and being compressed to approximately 85 percent of its original, relaxed size, the invention comprising a thin solid homogeneous coating of polytetrafluoroethylene bonded to one of said members and abutting complementary cylindrical surface portions of said elastomeric element for preventing binding thereat when said bushing is subjected to loading, said coating having a substantially uniform thickness throughout, approximating one-thousandth of an inch, retaining means for preventing said element from moving axially relative to said members, and wherein said retaining means comprises spaced flange means secured to one of said members to abut opposite ends of said element, said flange means comprising spaced first and second flanges secured to opposite ends of said member to extend radially toward said other member.

5. In an engine support system for a vehicle comprising a frame, a cylindrical trunnion member and an annular bushing assembly disposed therearound and comprising an outer metallic ring member having a single annular elastomeric element mounted therebetween with a durometer hardness approximating 80 and being compressed to approximately 85 percent of its original, relaxed size, the invention comprising a thin solid homogeneous coating of polytetrafluoroethylene bonded to one of said members and abutting complementary cylindrical surface portions of said elastomeric element for preventing binding thereat when said bushing is subjected to loading, said coating having a substantially uniform thickness throughout, approximating one-thousandth of an inch, retaining means for preventing said element from moving axially relative to said members, and wherein said retaining means comprises spaced flange means secured to said members to abut opposite ends of said element, and including a first flange secured at an end of said outer ring to extend radially inwardly toward said trunnion and a second flange secured at an opposite end of said trunnion to extend radially outwardly toward said outer ring.

* * * * *

UNITED STATES PATENT OFFICE
CERTIFICATE OF CORRECTION

Patent No. 3,633,856      Dated January 11, 1972

Inventor(s) DONALD R. CREWS

It is certified that error appears in the above-identified patent and that said Letters Patent are hereby corrected as shown below:

Col. 2, Claim 1, line 6, "8" should be --80--;

line 9, "bounded" should be --bonded--.

Signed and sealed this 16th day of May 1972.

(SEAL)
Attest:

EDWARD M. FLETCHER, JR.
Attesting Officer

ROBERT GOTTSCHALK
Commissioner of Patents